J. D. KELLOGG, Jr.
Churn.
No. 57,730.
Patented Sept. 4, 1866.
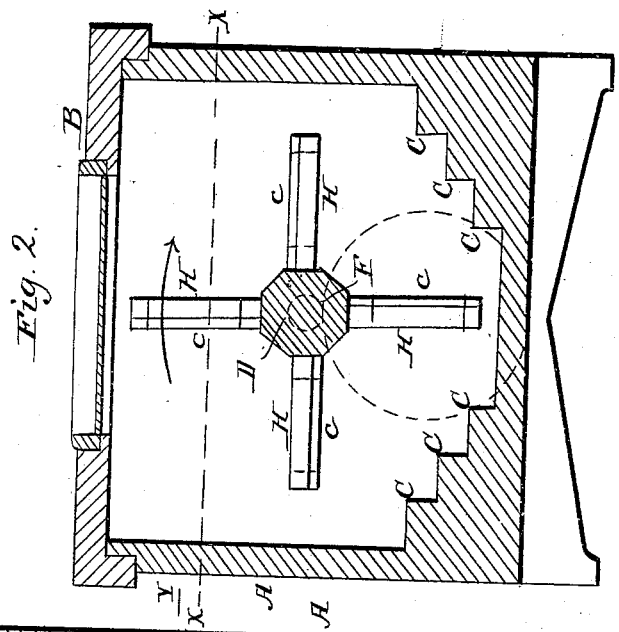
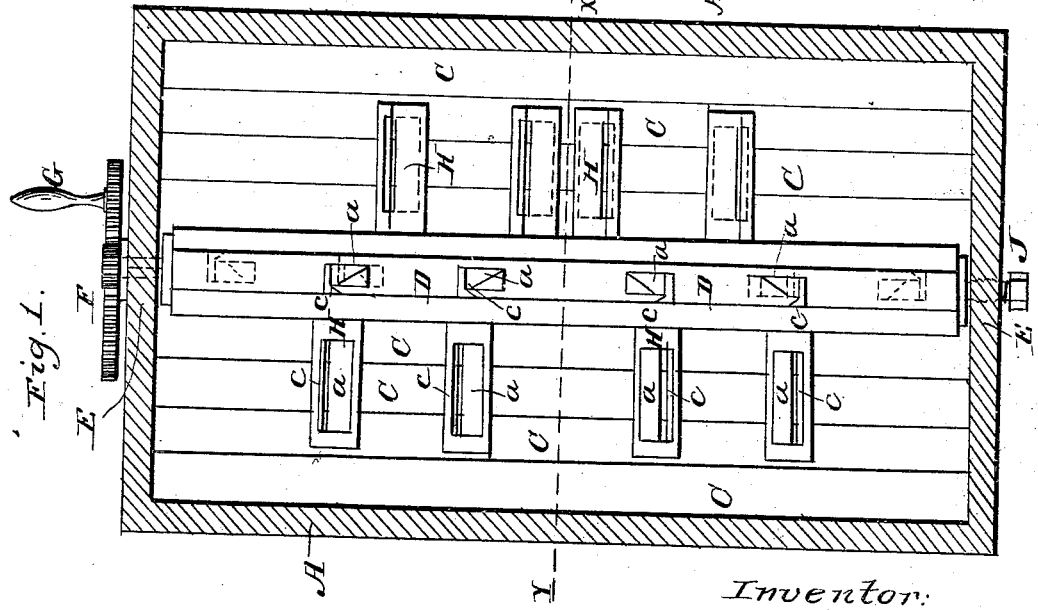
Witnesses:
Inventor:

UNITED STATES PATENT OFFICE.

J. D. KELLOGG, JR., OF NORTHAMPTON, MASSACHUSETTS.

IMPROVEMENT IN CHURNS.

Specification forming part of Letters Patent No. 57,730, dated September 4, 1866.

*To all whom it may concern:*

Be it known that I, J. D. KELLOGG, Jr., of Northampton, in the county of Hampshire, State of Massachusetts, have invented a new and useful Improvement in Churns; and I do hereby declare the following to be a full, clear, and exact description of the nature, construction, and operation of the same, sufficient to enable others skilled in the art to which my invention appertains to understand and use the same, reference being had to the accompanying drawings, which are made a part of this specification, and in which—

Figure 1 is a longitudinal horizontal section on the line $x\ x$, Fig. 2. Fig. 2 is a transverse section on the line $y\ y$, Fig. 1.

The improvement consists in the construction of the dasher, whose open face and inclined inner surfaces compress the cream and deflect it in curves into the path of the succeeding dasher, by which the operation is continued and the result quickly obtained.

In the drawings, A shows the box of the churn; B, the lid; C, the steps, which form deflecting surfaces for the cream which is thrown against them.

The dasher-shaft D is journaled in bearings E E, and is driven by the gearing F, propelled by the power applied to the handle G.

The dashers H are fixed at intervals radially on the shaft D, and have openings through them, as shown in the section. They revolve with the wide mouth of the opening exposed to the cream, which, by the inclined surface $a$, is deflected through the opening against the surface $c$, and by the latter, which is inclined in an opposite direction to the surface $a$, caused to complete a semicircular movement, throwing the cream into the path of the succeeding dasher.

The inclined planes $a$ may slope to the outer or inner edge, and may throw the cream toward the ends or center of the chamber, as may be convenient.

The dashers may be made each of a single piece by cutting out the opening, or the inclined portion $c$ may be a strip attached to the main part of the dasher.

The dasher is removed from the churn by loosening the thumb-screw J, or the dasher may be set in the chamber in any other suitable way familiar to experts.

In gathering the butter the dashers may be revolved awhile in the reverse direction, so as to present a flat and nearly unbroken surface to the cream, the opening being small at that side of the dasher.

Having thus described my invention, what I claim as new, and desire to secure by Letters Patent, is—

The dasher provided with the opening $b$ and the inclined surfaces $a\ c$, sloping in different directions, and operating as described.

JONA. D. KELLOGG, JR.

Witnesses:
 H. C. PRATT,
 A. PERRY PECK.